(12) United States Patent
Niehaus et al.

(10) Patent No.: US 10,307,805 B2
(45) Date of Patent: Jun. 4, 2019

(54) LANDFILL GAS WELLHEAD CAP ASSEMBLY

(71) Applicant: Q.E.D. Environmental Systems, Inc., Dexter, MI (US)

(72) Inventors: Kenneth L. Niehaus, Manchester, MI (US); David A. Fischer, Ann Arbor, MI (US)

(73) Assignee: Q.E.D. Environmental Systems, Inc., Dexter, MI (US)

( * ) Notice: Subject to any disclaimer, the term of this patent is extended or adjusted under 35 U.S.C. 154(b) by 71 days.

(21) Appl. No.: 15/500,774

(22) PCT Filed: Aug. 5, 2015

(86) PCT No.: PCT/US2015/043788
§ 371 (c)(1),
(2) Date: Jan. 31, 2017

(87) PCT Pub. No.: WO2016/022669
PCT Pub. Date: Feb. 11, 2016

(65) Prior Publication Data
US 2017/0216894 A1   Aug. 3, 2017

Related U.S. Application Data

(60) Provisional application No. 62/033,836, filed on Aug. 6, 2014.

(51) Int. Cl.
*B09B 1/00* (2006.01)
*E21B 33/03* (2006.01)

(52) U.S. Cl.
CPC .............. *B09B 1/006* (2013.01); *E21B 33/03* (2013.01)

(58) Field of Classification Search
CPC ........ B09B 1/006; E21B 33/03; Y02W 30/32; F16L 55/115
See application file for complete search history.

(56) References Cited

U.S. PATENT DOCUMENTS 3,458,050 A   7/1969   Cooper
4,702,754 A * 10/1987 Blocker ............ B01D 46/0012
                                                137/223

(Continued)

FOREIGN PATENT DOCUMENTS

EP        2 107 008 A1   10/2009
WO       2011006631 A1    1/2011

OTHER PUBLICATIONS

International Search Report and Written Opinion of the ISA for PCT/US2015/043788, ISA/KR, Daejeon, dated Oct. 13, 2015.

(Continued)

*Primary Examiner* — James G Sayre
(74) *Attorney, Agent, or Firm* — Harness, Dickey & Pierce, P.L.C.

(57) ABSTRACT

A well cap assembly is disclosed which is well suited for use with a wellhead. The well cap assembly has a port component and a cap element. The port component has a bore extending therethrough, an upper neck portion, and an upper threaded portion. The port component further has a lower threaded portion and a barb formed on the upper neck portion. The barb can receive an external flexible tube which is temporarily secured to the port component. The cap element has an internally threaded portion which engages with the upper threaded portion of the upper neck portion and seals the bore of the port component. The cap element also has a tether for securing it to the port component.

21 Claims, 5 Drawing Sheets

(56) References Cited

U.S. PATENT DOCUMENTS

| | | |
|---|---|---|
| 5,063,519 A | 11/1991 | Zison |
| 8,201,700 B2 | 6/2012 | Shibata et al. |
| 2001/0035649 A1* | 11/2001 | Campau ............ F16L 37/0985 285/319 |
| 2004/0177672 A1 | 9/2004 | Schmitt et al. |
| 2008/0127726 A1 | 6/2008 | Elkins |
| 2009/0236341 A1 | 9/2009 | McKinney et al. |
| 2011/0127232 A1 | 6/2011 | Willows et al. |

OTHER PUBLICATIONS

Extended European Search Report for corresponding European Patent Application No. 5830051.7 dated Mar. 19, 2018, 6 pages.

\* cited by examiner

SECTION A-A

LANDFILL GAS WELLHEAD CAP ASSEMBLY

CROSS-REFERENCE TO RELATED APPLICATIONS

This application is a 371 U.S. National Stage of International Application No. PCT/US2015/043788, filed Aug. 5, 2015. This application claims the benefit of U.S. Provisional Application No. 62/033,836, filed on Aug. 6, 2014. The entire disclosures of the above applications are incorporated herein by reference.

FIELD

The present disclosure relates to caps and like systems used for allowing a gas quality, pressure and flow checking instrument to be temporarily connected to a landfill gas system wellhead port to check the pressures and/or a rate of flow of gas through the wellhead. More particularly, the present disclosure relates to a new cap assembly that enables secure sealing of a cap component to a port component, and which further allows easy attachment of an external flexible hose to the port component when sampling needs to be performed, and which is able to more positively seal an orifice of the port component.

BACKGROUND

The statements in this section merely provide background information related to the present disclosure and may not constitute prior art.

Landfill gas wells typically have a port component to which an external gas flow rate sensing device may be temporarily attached. Typically these port components make use of one or more barbs formed on an outer surface of the port. An elastomeric cap component is slid over the port component to close off the port thereof. When a technician needs to check the gas flow through the wellhead, the cap component is slidably removed from the port component and an external rubber or plastic hose is attached to the port component. An opposite end of the hose is connected to an external gas quality, pressure and flow measurement device. When the technician is done making the gas (flow) measurements he/she would typically remove the hose that was used with the measurement device, and slide the cap component back over the barbs on the port component. Thus, the barbs sealing with the inside surface of the cap component is how a seal is achieved.

The above arrangement of a cap component making contact with the barbs on the port component has some drawbacks. For one, to achieve satisfactory sealing, there has to be an extremely tight fit between the cap component and the barbs, since this is where the actual sealing takes place. This often requires such a tight fit that the cap component can be difficult to slide on and off the port component. This is especially true in cold climates, where the rubber or plastic cap component may lose some of its stretchability. The very tight fit required also can result in rapid wear of the material on the inside surface of the cap component where contact with the barbs is made, which can lead to leaks of atmospheric air into the vacuum condition in the landfill gas collection wellhead and thereby degrade the energy and reuse value of the recovered gas. And the wear may not be that noticeable to the technician, so the possibility arises that the cap component inner surface may not be making a perfectly air tight seal with the port component, but this fact is not immediately detectable by the technician.

Still another drawback is that present day cap components used with wellhead structures are not able to seal an orifice of the port component to prevent freezing and blockage of the orifice during the winter months in cold climate areas. Freezing occurs when condensation occurs in the orifice and the condensation freezes. When this occurs, a technician must spend extra time unblocking the orifice before measurements can be taken through the port component. A cap assembly that can help prevent freezing and blockage of the orifice of the port component would therefore be highly desirable.

SUMMARY

This section provides a general summary of the disclosure, and is not a comprehensive disclosure of its full scope or all of its features.

In one aspect the present disclosure relates to a well cap assembly for use with a wellhead, wherein the wellhead enables a fluid being extracted from a well to flow therethrough. The well cap assembly has a port component and a cap element. The port component has a bore extending therethrough, an upper neck portion, and an upper threaded portion. The upper threaded portion is formed adjacent the upper neck portion and has a diameter which is less than a diameter formed by the upper threaded portion. The port component further has a lower threaded portion and a circumferential barb formed on the upper neck portion. The circumferential barb is configured to slidably receive an external flexible tube which is temporarily secured over the upper neck portion, to thus form a generally leak proof connection with the external flexible tube. The cap element has an internally threaded portion for threadably engaging with the upper threaded portion of the upper neck portion and sealing the bore of the port component. The cap element also has a tether for securing the cap element to the port component while still permitting rotational movement of the cap element relative to the port component.

In another aspect the present disclosure relates to a well cap assembly for use with a wellhead, wherein the wellhead enables a fluid extracted from a well to flow therethrough. The well cap assembly comprises a port component and a cap element. The port component has a bore extending therethrough, an upper neck portion, and an upper threaded portion formed adjacent the upper neck portion. The upper neck portion has a diameter which is less than a diameter formed by the upper threaded portion. The port component also has a lower threaded portion and a circumferential barb formed on the upper neck portion. The barb is configured to slidably receive an external flexible tube which is temporarily secured over the upper neck portion, to thus form a generally leak proof connection with the external flexible tube. The port component also includes an integrally formed nut adjacent the lower threaded portion for enabling an open end wrench to be used to engage the integrally formed nut and to thread the port component into a threaded bore in the wellhead. The cap element has an internally threaded portion for threadably engaging with the upper threaded portion of the upper neck portion and sealing the bore of the port component.

In still another aspect the present disclosure relates to a well cap assembly for use with a wellhead, wherein the wellhead enables a fluid extracted from a well to flow therethrough. The well cap assembly comprises a port component and a cap element. The port component has a bore extending therethrough, an upper neck portion and an upper threaded portion formed adjacent the upper neck portion. The upper neck portion has a diameter which is less than a diameter formed by the upper threaded portion. The port component also has a lower threaded portion and a circumferential barb formed on the upper neck portion. The barb is configured to slidably receive an external flexible tube which is temporarily secured over the upper neck portion, to form a generally leak proof connection with the external flexible tube. The cap element has an internally threaded portion for threadably engaging with the upper threaded portion of the upper neck portion and sealing the bore of the port component. A sealing element is also included which is secured to an inner upper end of the cap element. The sealing element is configured to engage an upper edge of the upper neck portion when the cap element is threadably secured to the port component. A tether is also included for securing the cap element to the port component while still permitting rotational movement of the cap element relative to the port component.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
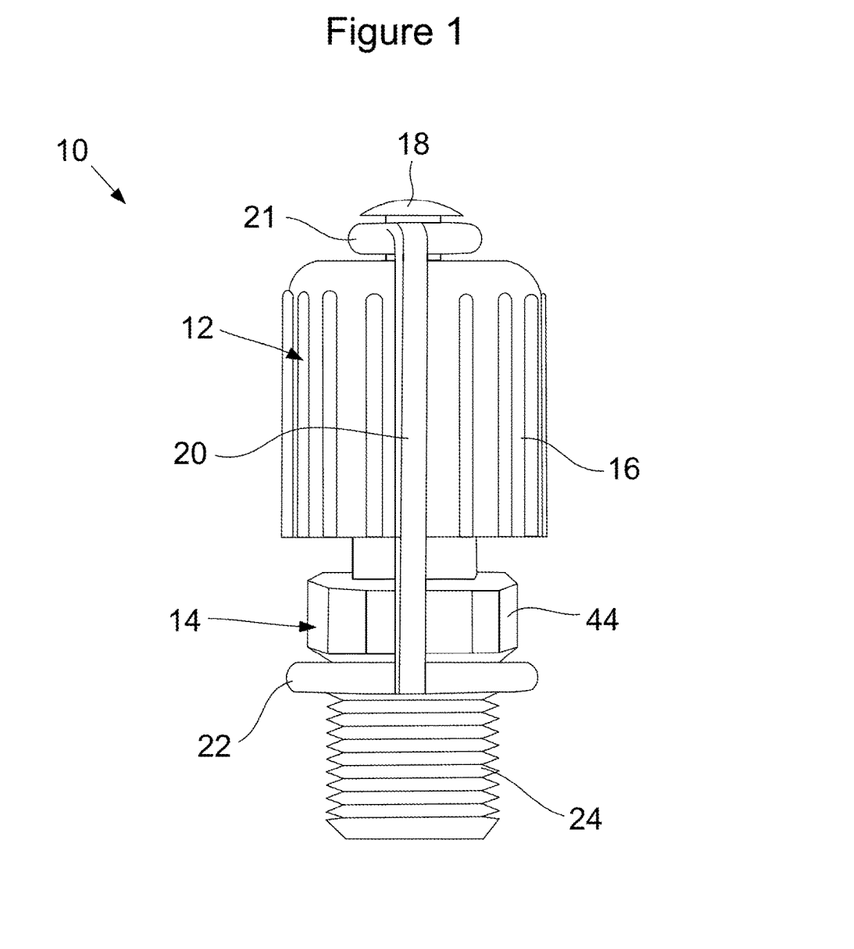
FIG. 1 is a side elevational view of one embodiment of a well cap assembly in accordance with the present disclosure, where a cap component of the assembly is secured to a port component of the assembly.
Figure 2:
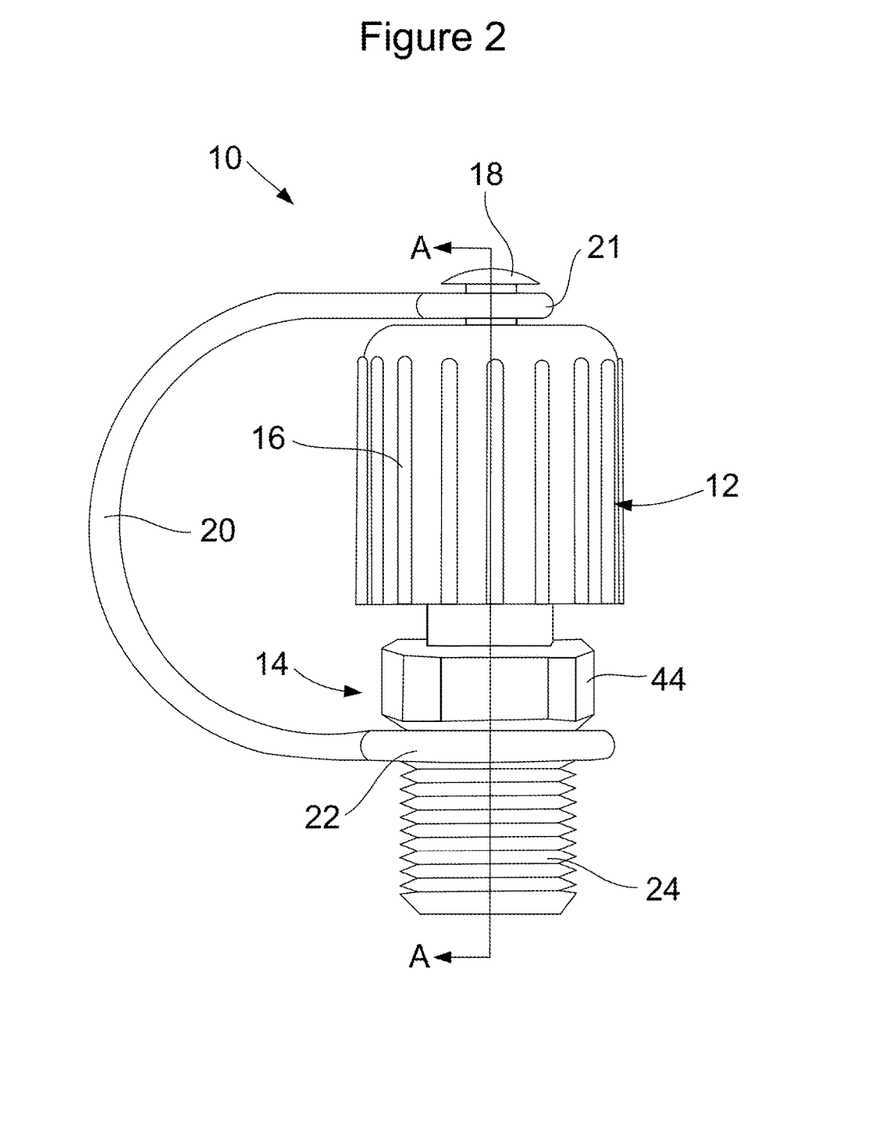
FIG. 2 is view of the cap assembly of FIG. 1 but with the cap assembly rotated 90 degrees from the view shown in FIG. 1 to better illustrate a tether that holds the cap component to the port component.

Referring to FIGS. 1 and 2, a well cap assembly 10 is shown in accordance with one embodiment of the present disclosure. The well cap assembly 10 may include a cap component 12 and a port component 14. The cap component 12 may include a cap element 16 having a retaining button 18 around which one end 21 of a tether 20 may be secured. The other end of the tether 20 may form a loop 22 that is wrapped around the port component 14 so as not to be removable from the port component once the port component is physically attached to a well head structure (not shown).

Figure 3:
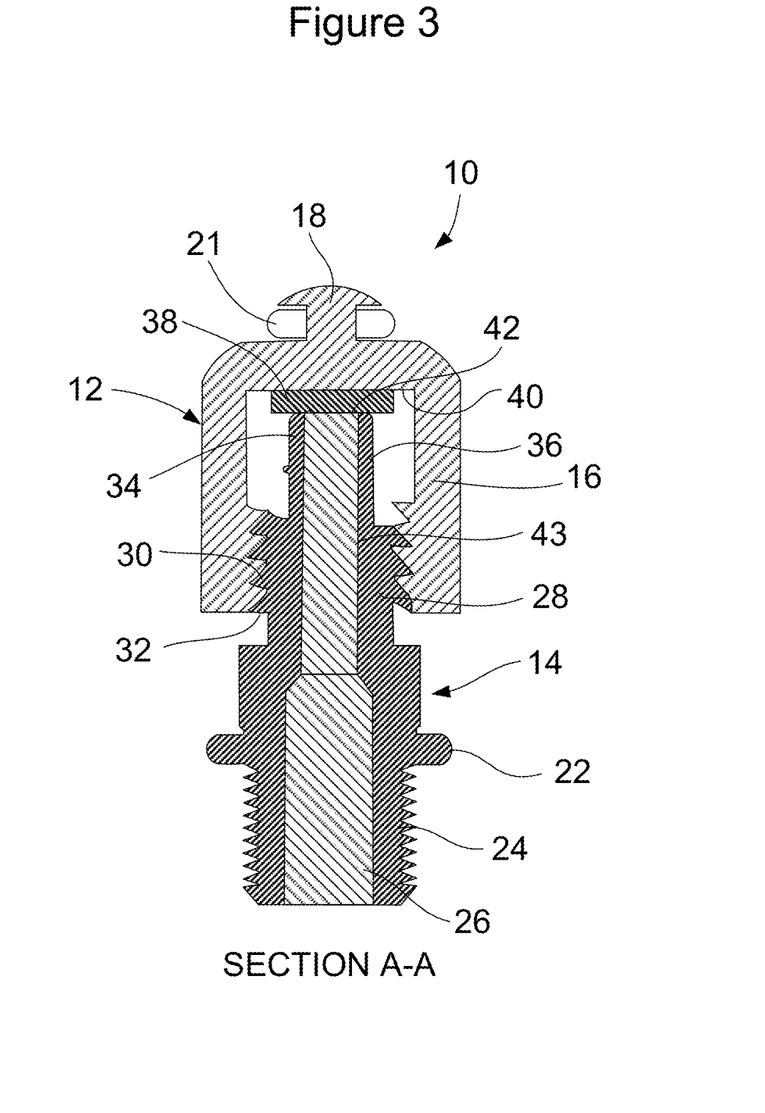
FIG. 3 is a cross sectional side view taken in accordance with section line A-A in FIG. 2 showing the cap component sealingly engaged with the port component.

The port component 14 includes a threaded portion 24 which can be threadably attached to a threaded bore in the wellhead. As shown in FIG. 3, the port component 14 includes a bore 26 and an upper threaded portion 28. The upper threaded portion 28 is configured to engage with mating threads 30 formed on an inside surface 32 of the cap element 16. The diameter of the opening formed by the threads 30 is sufficient to allow the cap element 16 to be placed over an upper neck portion 34 of the port component 14 without interference from the upper threaded portion 28. The upper neck portion 34 may include one or more barbs 36, which in one embodiment are "soft" barbs. By "soft" barbs it is meant barbs that are not aggressively shaped. The single soft barb 36 illustrated in FIG. 3 is essentially a semicircular shaped ridge that protrudes from the upper neck portion 34 about the entire circumference of the upper neck portion.

The cap component 12 may also include a sealing element 38 secured, for example by suitable adhesives, to an inner upper end 40 of the cap component 12. The sealing element 38 may comprise an elastomeric component that has some degree of resiliency so that it is able to deform slightly and seal against an upper edge 42 of the upper neck portion 34 when the cap component 12 is tightly threaded onto the port component 14. This serves to provide an excellent seal to ensure no leakage of gas occurs out from the well head to which the port component 14 is attached.

Figure 4:
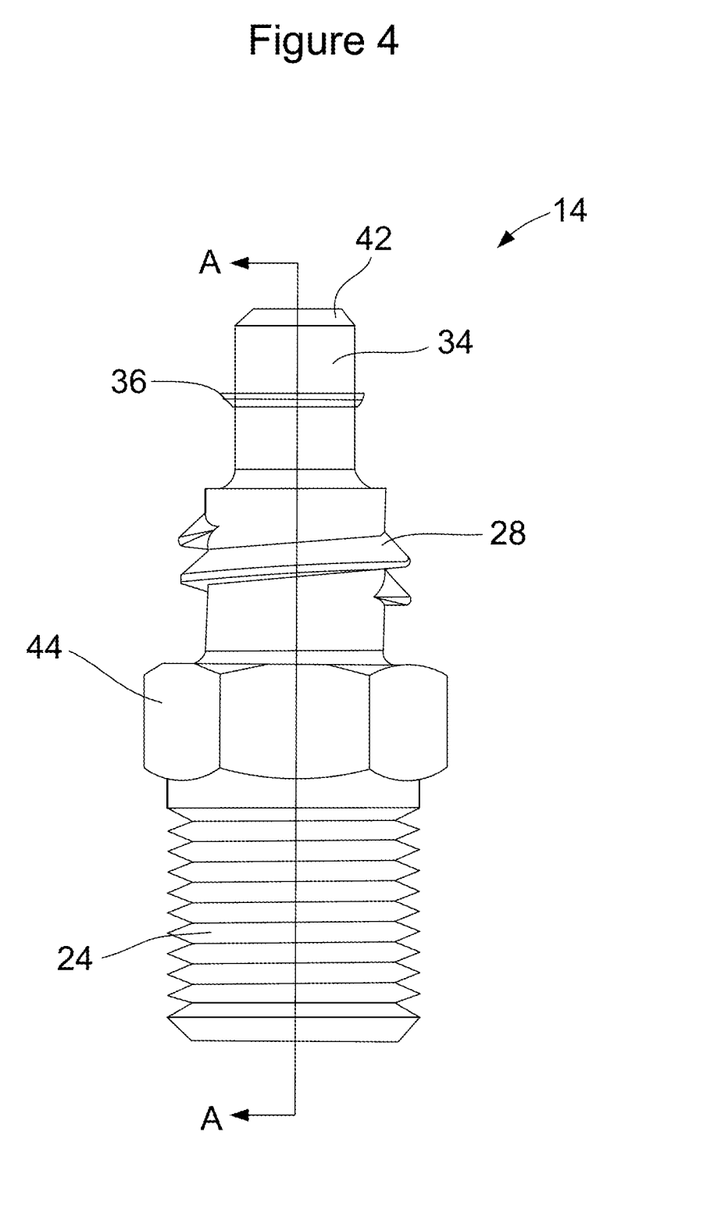
FIG. 4 is a side elevation view of just the port component of the well cap assembly.

With reference to FIGS. 3 and 4, the port component 14 further includes an integrally formed nut 44. The nut 44 enables the port component 14 to be threaded into a mating threaded bore in the wellhead using a conventional open end wrench and tightened securely. The upper threaded portion 28 in this example comprises a buttress thread, and it will be appreciated that the threads 30 on the inside surface 32 of the cap element 16 also incorporates a matching buttress thread. While a buttress thread is preferable for making an excellent connection, it will be appreciated that the cap assembly 10 is not limited to use with any one particular style of thread.

In operation, when a technician needs to check a gas flow rate at a wellhead that the cap assembly 10 is attached to, the technician would unscrew the cap component 12 from the port component 14. This can be done easily by hand. The tether 20 allows the cap component 12 to hang free while the technician slips the end of an external flexible (rubber or plastic) hose over the barb 36 on the upper neck portion 34. As noted above, the barb 36 may be a soft barb which allows easily pushing the external hose onto the upper neck portion 34 and easy removal from the upper neck portion. The soft nature of the barb 36 ensures that virtually no wear and tear occurs on the inside surface of the external hose. When the technician is done making measurements, the external hose can be slid off of the upper neck portion 34 and the cap component 12 can be threaded back onto the upper threaded portion 28 of the port component 14. Once the cap component 12 is fully threaded onto the port component 14, the sealing element 38 will be engaging the upper edge 42 of the upper neck portion 34, thus sealing off the bore 26 of the port component 14 to ensure against any gas leakage. This arrangement is expected to provide an even better seal than simply sliding a piece of hose or tubing over the end of a conventionally barbed port, as is typically presently done with conventional port components used with landfill gas wellheads.

Figure 5:
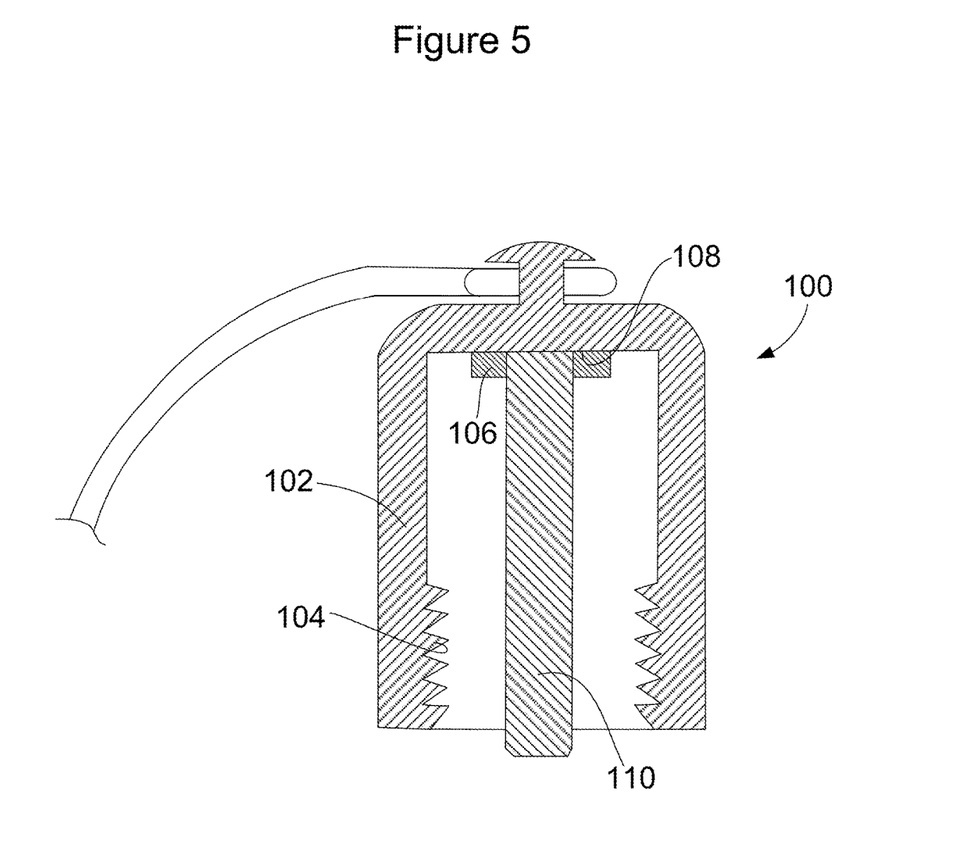
FIG. 5 is a side cross sectional view of another embodiment of the cap component of the well cap assembly that incorporates a plug.

FIG. 5 shows a cap component 100 in accordance with another embodiment of the present disclosure. The cap component 100 is similar to cap component 12 and likewise includes a cap element 102 with a threaded inner surface 104 and a resilient (e.g., elastomeric) sealing element 106 (e.g., elastomeric) secured to an inner wall 108. The cap component 100, however, also includes a plug 110 preferably formed from a metallic material, for example from stainless steel or aluminum. The plug 110 has a diameter just slightly less than the diameter of bore portion 43 of the port component 14 (see FIG. 3) so that it can be easily inserted into the bore portion 43, and so that there is only minimal clearance between the outer surface of the plug 110 and the inner surface of the bore portion 43. The plug 110 also preferably has a length such that it will extend into the port component 14, when the cap element 102 is fully threaded onto the port component 14, a significant portion of the length of the port component 14, or possibly even the entire length of the port component 14. This enables the plug 110 to protrude slightly into the path of the gas flowing through the wellhead. The plug 110 serves to conduct heat from the warm gas flowing through the wellhead to the inner surface of the bore portion 43 of the port component 14, to thus warm the port component 14, and thus prevent the buildup and blocking of the bore portion 43 with ice. In this regard it will be appreciated that freezing can occur when condensation inside the port component 14 freezes. If this occurs, the technician must first remove the blockage before he/she can attach the external hose of the measurement device to take gas flow readings. It will also be appreciated that the length of the plug 110 will dictate the length of the tether 20 that is needed, since the tether needs to be sufficiently long to allow the plug 110 to be manipulated into and out from the port component 14. The plug 110 may be insert molded with the cap element 102 or attached to the cap component in any other suitable manner.

The cap assembly 10 and its various embodiments discussed herein all provide a convenient, relatively inexpensive means for both closing off and allowing quick and easy access to a wellhead for gas flow sampling purposes. The cap assembly 10 can be installed in existing wellheads which have a threaded port for accepting the port component 14, and without any modification being required to the wellhead. The cap assembly 10 and its different embodiments make it even quicker and easier for the technician to attach gas flow measurement equipment to a wellhead to perform gas flow measurements.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A well cap assembly for use with a wellhead, the wellhead enabling a fluid extracted from a well to flow therethrough, the well cap assembly comprising:
   a port component having:
      a bore extending therethrough;
      an upper neck portion;
      an upper threaded portion formed adjacent the upper neck portion and co-linear with the upper neck portion, the upper neck portion having a diameter which is less than a diameter formed by the upper threaded portion;
      a lower threaded portion;
      a circumferential barb formed on the upper neck portion configured to slidably receive an external flexible tube which is temporarily secured over the upper neck portion, to thus form a generally leak proof connection with the external flexible tube;
   a cap element having an internally threaded portion for threadably engaging with the upper threaded portion of the upper neck portion and sealing the bore of the port component; and
   the upper neck portion enabling either the external flexible tube or the cap element to be coupled directly thereto.

2. The well cap assembly of claim 1, further comprising a tether for securing the cap element to the port component while still permitting rotational movement of the cap element relative to the port component.

3. The well cap assembly of claim 2, further comprising a resilient sealing component affixed to an inner upper end of the cap element, for engaging an upper edge of the upper neck portion when the cap element is tightened onto the upper threaded portion of the neck portion.

4. The well cap assembly of claim 3, wherein a second end of the tether forms a loop disposed around the port component adjacent the lower threaded portion.

5. The well cap assembly of claim 2, wherein the cap element includes a retaining button for retaining a first end of the tether to the cap element.

6. The well cap assembly of claim 1, wherein the port component includes an integrally formed nut adjacent the lower threaded portion for enabling an open end wrench to be used to engage the integrally formed nut and to thread the port component into a threaded bore in the wellhead.

7. The well cap assembly of claim 1, wherein the upper threaded portion of the port component comprises a buttress thread.

8. The well cap assembly of claim 1, further comprising an elongated plug extending perpendicular from an inner upper end of the cap element and aligned coaxially with an axial center of the cap element, the elongated plug having a length sufficiently long to extend through into a flow path of fluid flowing through the wellhead when the cap element is attached to the port component.

9. The well cap assembly of claim 8, wherein the elongated plug is comprised of a metallic material.

10. The well cap assembly of claim 8, wherein the elongated plug is comprised of at least one of stainless steel or aluminum.

11. A well cap assembly for use with a wellhead, the wellhead enabling a fluid extracted from a well to flow therethrough, the well cap assembly comprising:
    a port component having:
       a bore extending therethrough;
       an upper neck portion;
       an upper threaded portion formed adjacent the upper neck portion and co-linearly with the upper neck portion, the upper neck portion having a diameter which is less than a diameter formed by the upper threaded portion;
       a lower threaded portion extending co-linearly with the upper neck portion;
       an integrally formed nut formed adjacent the lower threaded portion for enabling an external tool to be used to turn the lower threaded portion when coupling the port component to a threaded bore of a wellhead;
       a circumferential barb formed on the upper neck portion configured to slidably receive an external flexible tube which is temporarily secured over the upper neck portion, to thus form a generally leak proof connection with the external flexible tube;

an integrally formed nut adjacent the lower threaded portion for enabling an open end wrench to be used to engage the integrally formed nut and to thread the port component into a threaded bore in the wellhead;
a cap element having an internally threaded portion for threadably engaging with the upper threaded portion of the upper neck portion and sealing the bore of the port component.

12. The well cap assembly of claim 11, comprising a tether for securing the cap element to the port component while still permitting rotational movement of the cap element relative to the port component.

13. The well cap assembly of claim 12, wherein the cap element includes a retaining button for securing one end of the tether to the cap element.

14. The well cap assembly of claim 12, wherein the cap element includes a sealing element affixed to an inner upper end thereof for engaging an upper edge of the upper neck portion when the cap element is threadably secured to the port component.

15. The well cap assembly of claim 14, wherein the sealing element comprises an elastomeric component.

16. The well cap assembly of claim 12, further comprising an elongated plug extending perpendicularly from an inner upper end of the cap element, and coaxially with an axial center of the cap element, the elongated plug having a length sufficient to extend through the port component and into a flow path of the fluid flowing within the wellhead when the cap element is secured to the port component.

17. The well cap assembly of claim 16, further including a sealing element disposed on the inner upper end of the cap element so as to circumscribe a portion of the elongated plug.

18. The well cap assembly of claim 11, wherein the upper threaded portion comprises a buttress thread.

19. A well cap assembly for use with a wellhead, the wellhead enabling a fluid extracted from a well to flow therethrough, the well cap assembly comprising:
a port component having:
a bore extending therethrough;
an upper neck portion;
an upper threaded portion formed adjacent the upper neck portion, the upper neck portion having a diameter which is less than a diameter formed by the upper threaded portion;
a lower threaded portion extending co-linearly with the upper neck portion;
an integrally formed nut formed adjacent the lower threaded portion for enabling an external tool to be used to turn the lower threaded portion when coupling the port component to a threaded bore of a wellhead; and
a circumferential barb formed on the upper neck portion configured to slidably receive an external flexible tube which is temporarily secured over the upper neck portion, to thus form a generally leak proof connection with the external flexible tube;
a cap element having:
an internally threaded portion for threadably engaging with the upper threaded portion of the upper neck portion and sealing the bore of the port component;
a sealing element secured to an inner upper end of the cap element, the sealing element configured to engage an upper edge of the upper neck portion when the cap element is threadably secured to the port component;
a tether for securing the cap element to the port component while still permitting rotational movement of the cap element relative to the port component; and
the upper neck portion enabling either the external flexible tube or the cap element to be coupled directly thereto.

20. The well cap assembly of claim 19, further comprising an elongated plug extending from the inner upper end of the cap element, the elongated plug having a length sufficient to extend through the port component and to project into a flow path within the wellhead when the well cap assembly is secured to a port of the wellhead.

21. The well cap assembly of claim 20, wherein the elongated plug is comprised of at least one of stainless steel or aluminum.

* * * * *